(12) United States Patent
Sibbach et al.

(10) Patent No.: US 11,833,779 B2
(45) Date of Patent: Dec. 5, 2023

(54) COMPOSITE COMPONENT WITH OIL BARRIER COATING

(71) Applicant: General Electric Company, Schenectady, NY (US)

(72) Inventors: Arthur William Sibbach, Boxford, MA (US); Wendy Wenling Lin, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 179 days.

(21) Appl. No.: 16/953,970

(22) Filed: Nov. 20, 2020

(65) Prior Publication Data

US 2022/0161520 A1 May 26, 2022

(51) Int. Cl.
*B32B 15/08* (2006.01)
*B32B 15/20* (2006.01)
(Continued)

(52) U.S. Cl.
CPC ............... *B32B 15/08* (2013.01); *B32B 7/12* (2013.01); *B32B 15/14* (2013.01); *B32B 15/20* (2013.01); *B32B 27/08* (2013.01); *B32B 27/18* (2013.01); *B32B 27/32* (2013.01); *C09J 7/35* (2018.01); *C09J 133/08* (2013.01); *C09J 163/00* (2013.01); *F04D 29/4226* (2013.01); *B32B 2250/03* (2013.01); *B32B 2250/04* (2013.01); *B32B 2255/26* (2013.01); *B32B 2307/31* (2013.01); *B32B 2307/7265* (2013.01); *B32B 2311/24* (2013.01); *B32B 2313/04* (2013.01); *B32B 2323/04* (2013.01); *B32B 2323/10* (2013.01);
(Continued)

(58) Field of Classification Search
None
See application file for complete search history.

(56) References Cited

U.S. PATENT DOCUMENTS

| 3,365,327 A | 1/1968 | Puyear et al. |
| 4,926,963 A * | 5/1990 | Snyder ................ B32B 15/04 |
| | | 428/920 |

(Continued)

FOREIGN PATENT DOCUMENTS

| JP | 2017-074675 | * | 4/2017 | ............. B29C 45/14 |
| WO | WO-2020011989 A1 * | 1/2020 | ............. B32B 27/08 |

OTHER PUBLICATIONS

Reyes—glass-fiber-PP=aluminum laminate w- adhesion layer—Comp.Sci. Tech.—2000 (Year: 2000).*
(Continued)

*Primary Examiner* — John Vincent Lawler
(74) *Attorney, Agent, or Firm* — McGarry Bair PC

(57) ABSTRACT

A coated component having a composite substrate and a coating system disposed thereon is provided. The coating system is substantially non-porous such that hydrocarbon fuel or other carbonaceous fluids are prevented from contacting and impregnating the polymer matrix composite material. The coating system can include an aluminum layer or a film layer comprising a polyethylene film or a polypropylene film. Also provided is a composite fan casing for a gas turbine engine having a polymer matrix composite substrate and a coating system disposed thereon. Methods for forming a containment assembly of a gas turbine engine are provided.

18 Claims, 4 Drawing Sheets

(51) Int. Cl.
  *B32B 15/14* (2006.01)
  *B32B 27/32* (2006.01)
  *C09J 7/35* (2018.01)
  *C09J 163/00* (2006.01)
  *C09J 133/08* (2006.01)
  *F04D 29/42* (2006.01)
  *B32B 27/08* (2006.01)
  *B32B 27/18* (2006.01)
  *B32B 7/12* (2006.01)

(52) U.S. Cl.
  CPC ....... *B32B 2363/00* (2013.01); *B32B 2367/00* (2013.01); *B32B 2603/00* (2013.01); *F05D 2300/603* (2013.01)

(56) References Cited

U.S. PATENT DOCUMENTS

| | | | |
|---|---|---|---|
| 6,676,992 B2 | 1/2004 | Pfaendtner et al. | |
| 6,814,541 B2 * | 11/2004 | Evans | B29C 33/40 |
| | | | 415/200 |
| 6,942,897 B2 | 9/2005 | Joyce et al. | |
| 7,320,825 B2 | 1/2008 | Morabito | |
| 7,374,404 B2 | 5/2008 | Schilling | |
| 7,431,978 B2 | 10/2008 | Blanton et al. | |
| 7,776,434 B2 | 8/2010 | Whiteker et al. | |
| 7,871,486 B2 | 1/2011 | Xie et al. | |
| 8,475,895 B2 | 7/2013 | Xie | |
| 8,647,713 B2 | 2/2014 | Brossier et al. | |
| 9,045,991 B2 | 6/2015 | Read et al. | |
| 9,062,563 B2 | 6/2015 | Varanasi et al. | |
| 9,316,120 B2 | 4/2016 | Le Borgne et al. | |
| 2010/0151239 A1 * | 6/2010 | Hebert | B32B 7/12 |
| | | | 156/60 |
| 2012/0082541 A1 | 4/2012 | Macchia et al. | |
| 2016/0281737 A1 * | 9/2016 | Turner | F01D 5/02 |
| 2018/0282854 A1 | 10/2018 | Task et al. | |
| 2018/0340445 A1 | 11/2018 | Opalka et al. | |
| 2020/0307157 A1 * | 10/2020 | Blohowiak | B32B 38/00 |
| 2020/0331250 A1 * | 10/2020 | Markowski | B32B 5/145 |

OTHER PUBLICATIONS

Zhou—aluminum spray coating on polymer matrix composites—2011 (Year: 2011).*
Santos—carbon-fiber-polymer—galvanic corrosion—aluminum—Mat.Design—2015 (Year: 2015).*
Srinivasan—attenuate galvanic corrosion between aluminum & carbon-fiber composite—J.Electrchem.Soc.—2015 (Year: 2015).*
Ando—JP 2017-074675 A—MT—epoxy + modified PP + PP + glass fiber reinforced PP on metal—2017 (Year: 2017).*

* cited by examiner

COMPOSITE COMPONENT WITH OIL BARRIER COATING

FIELD

The present subject matter relates generally to components formed from composite materials. More particularly, the present subject matter relates to coating systems for composite components, such as fan case containment systems of gas turbine engines.

BACKGROUND

A turbofan gas turbine engine used for powering an aircraft in flight typically includes, in serial flow communication, a fan assembly, a low pressure compressor or booster, a high pressure compressor, a combustor, a high pressure turbine, and a low pressure turbine. The combustor generates combustion gases that are channeled in succession to the high pressure turbine where they are expanded to drive the high pressure turbine, and then to the low pressure turbine where they are further expanded to drive the low pressure turbine. The high pressure turbine is drivingly connected to the high pressure compressor via a first rotor shaft, and the low pressure turbine is drivingly connected to both the fan assembly and the booster via a second rotor shaft.

Aircraft engine design continually requires components of aircraft engines to have lighter weight materials to increase the aircraft's fuel efficiency and thrust capabilities. In the past, aircraft components have been made with steel. However, steel is relatively heavy and has been replaced with lighter weight high strength materials, such as aluminum or titanium. A further development in producing lightweight parts has resulted in the advent of non-metallic materials, such as composites materials. Composite materials include materials that include embedded fibers inside of a matrix material. The fibers provide reinforcement for the matrix material.

Composite materials are hybrid materials formed by embedding reinforcement fibers, whiskers, or particles in a matrix which supports and protects the reinforcement. A variety of reinforcements are available, and carbon, graphite, glass, and Kevlar (trademark for an aromatic polyamide fiber) fibers in particular now enjoy widespread use in aerospace and other applications. Both metallic and nonmetallic matrices are available, and nonmetallics such as epoxies and polyimides are widely used for applications where the part is not exposed to high temperatures. Thus, for example, a composite material might consist of 60 volume percent of graphite fibers in a curable epoxy matrix. Certain components of the aircraft gas turbine engine are manufactured from composite materials, such as fan ducts and fan cases. For example, U.S. Pat. No. 5,145,621 discloses a graphite epoxy composite fan duct and U.S. Pat. No. 5,597,435 discloses a graphite epoxy composite fan case.

During operation of the engine, certain composite components can be exposed to hydrocarbon fuel or other carbonaceous components. Surface oil contamination of polymer composite components has been known to result in oil infiltration of the composite material. Once the oil has infiltrated the composite material it is nearly impossible to remove, and reduces the ability to adhere a repair patch or otherwise bond a material to the composite component.

Accordingly, improved composite components, such as containment casings or shells and fan ducts for gas turbine engines would be desirable. For instance, providing an improved composite component capable of repair such that a reduction in the scrap of composite parts is achieved would be desirable.

BRIEF DESCRIPTION

Aspects and advantages of the invention will be set forth in part in the following description, or may be obvious from the description, or may be learned through practice of the invention.

In one exemplary embodiment of the present subject matter, a coated component is provided. The coated component includes a composite substrate and a coating system disposed on the composite substrate. The coating system comprises a non-porous coating system such that hydrocarbon fuel or other carbonaceous fluids are prevented from contacting and impregnating the composite substrate. The coating system includes an aluminum layer or a film layer comprising a polyethylene film or a polypropylene film.

In another exemplary embodiment of the present subject matter, a composite fan casing for a gas turbine engine is provided. The casing comprises a core formed from a composite substrate and a coating system disposed on the composite substrate. The coating system comprises a non-porous coating system such that hydrocarbon fuel or other carbonaceous fluids are prevented from contacting and impregnating the composite substrate. The coating system includes at least one aluminum layer or at least one film layer comprising a polyethylene film or a polypropylene film.

In a further exemplary embodiment of the present subject matter, a method for forming a containment case of a gas turbine engine is provided. The method comprises forming a containment case from a polymer matrix composite; and coating the polymer matrix composite with a coating system including an aluminum layer, a polyethylene film layer, a polypropylene film layer, or combinations thereof, such that the coating system is non-porous such that hydrocarbon fuel or other carbonaceous oil fluids are prevented from contacting and impregnating the polymer matrix composite; and disposing the containment case about a plurality of fan blades of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
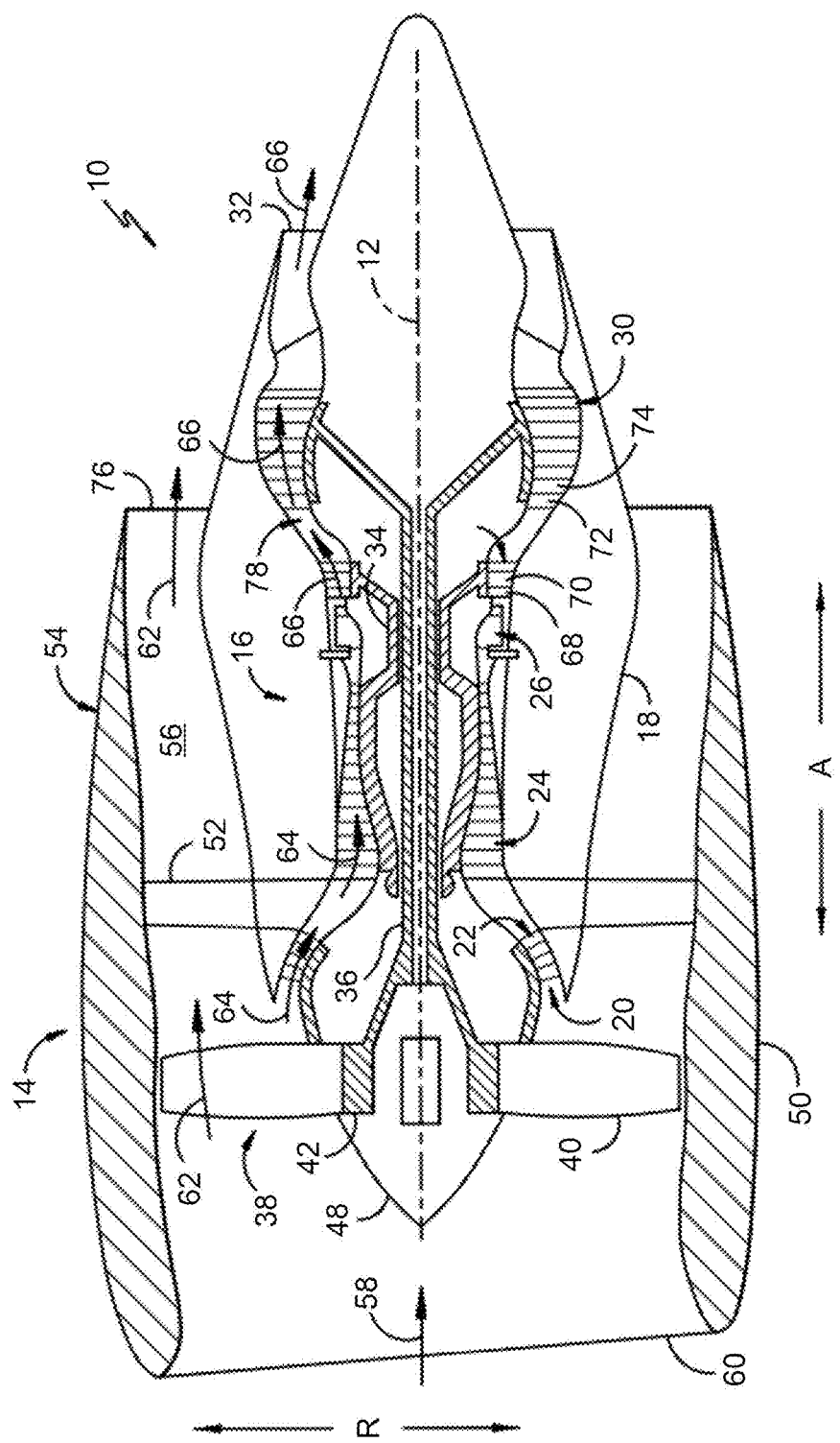
FIG. 1 provides a schematic cross-section view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter provides coated components, such as composite components for gas turbine engines that are coated with a coating system including an aluminum layer, a polyethylene layer, a polypropylene layer, or combinations thereof. The coating system is disposed on the composite substrate such that hydrocarbon fuel and other carbonaceous fluids are prevented from contacting and absorbing into the composite substrate. Methods for forming fan containment case assemblies also are provided.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal centerline 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that fan case (nacelle) 50 may be configured to be supported relative to the core turbine engine 16 by a plurality of circumferentially-spaced outlet guide vanes 52. Moreover, a downstream section 54 of the fan case 50 may extend over an outer portion of the core turbine engine 16 so as to define a bypass airflow passage 56 therebetween.

During operation of the turbofan engine 10, a volume of air 58 enters turbofan engine 10 through an associated inlet 60 of the fan case 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air indicated by arrows 62 and the second portion of air as indicated by arrows 64 is commonly known as a bypass ratio. The pressure of the second portion of air as indicated by arrows 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air indicated by arrows 62 is substantially increased as the first portion of air indicated by arrows 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of the turbofan engine 10 may comprise a composite material, such as a polymer matrix composite (PMC) material or a ceramic matrix composite (CMC) material, which has high temperature capability. Composite materials generally comprise a fibrous reinforcement material embedded in matrix material, e.g., a polymer or ceramic matrix material. The reinforcement material serves as a load-bearing constituent of the composite material, while the matrix of a composite material serves to bind the fibers together and act as the medium by which an externally applied stress is transmitted and distributed to the fibers.

PMC materials are typically fabricated by impregnating a fabric or unidirectional tape with a resin (prepreg), followed by curing. Prior to impregnation, the fabric may be referred to as a "dry" fabric and typically comprises a stack of two or more fiber layers (plies). The fiber layers may be formed of a variety of materials, nonlimiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg. For example, multiple layers of prepreg may be stacked to the proper thickness and orientation for the part, and then the resin may be cured and solidified to render a fiber reinforced composite part. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

In some embodiments, the "dry" fabric (i.e., an unimpregnated fabric) may be used as one or more layers of a component of the turbofan engine 10. For instance, a fabric may be formed from fibers of carbon, glass, polymer, and/or metal as described above. Without impregnating the fabric with a resin, layers of the fabric may be wrapped about other segments of the component, e.g., to impart certain characteristics to the component due to the fibers used to form the fabric.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., 3M's Nextel 440 and 480), and chopped whiskers and fibers (e.g., 3M's Nextel 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As described in greater detail herein, the fan section 14 of the turbofan engine 10 includes a fan containment case assembly that includes the fan case 50 and that circumscribes and surrounds the fan 38 and the fan blades 40 to retain any fan blades 40 or fan blade fragments dislodged from the engine fan 38. A "blade-out event" or a fan blade-out (FBO) event arises when a fan blade or portion thereof is accidentally released from a rotor of a high-bypass turbofan engine. When suddenly released during flight, a fan blade can impact a surrounding fan case with substantial force, sometimes penetrating the fan case and travelling into the fan containment case assembly.

Typical fan containment case assemblies are of two primary types: "hardwall" systems and "softwall" systems. Hardwall systems include an annular containment case manufactured from a high strength material with an adequate shell thickness to absorb the kinetic energy of an impacting fan blade. The hardwall system is a rigid structure, and as such, the shell may be formed from a composite material, e.g., a PMC material consisting of carbon (e.g., graphite) fibers and epoxy resin or a metallic material. Extra shell material may be applied to the high strength material, e.g., to contain a metal leading edge of a fan blade and/or in the root impact zone, which has the maximum energy of the impacting fan blade. For instance, a layer of composite material, such as a PMC material, may be applied to the outer surface of a metallic shell as extra shell material.

Softwall systems employ nesting areas defined by inner and outer annular shells having honeycomb or other suitable structures disposed therein. In addition, ballistic material, such as an aromatic polyamide fiber (e.g., Kevlar®), may be wrapped around the case structure. Blade fragments are captured within the system and prevented from further contact with other fan blades. More particularly, the ballistic material utilizes "dry" fibers, i.e., fibers not embedded in a matrix, to contain blades or blade fragments in a manner similar to catching the projectiles in a net. Hardwall and softwall systems also may be combined.

Figure 2A:
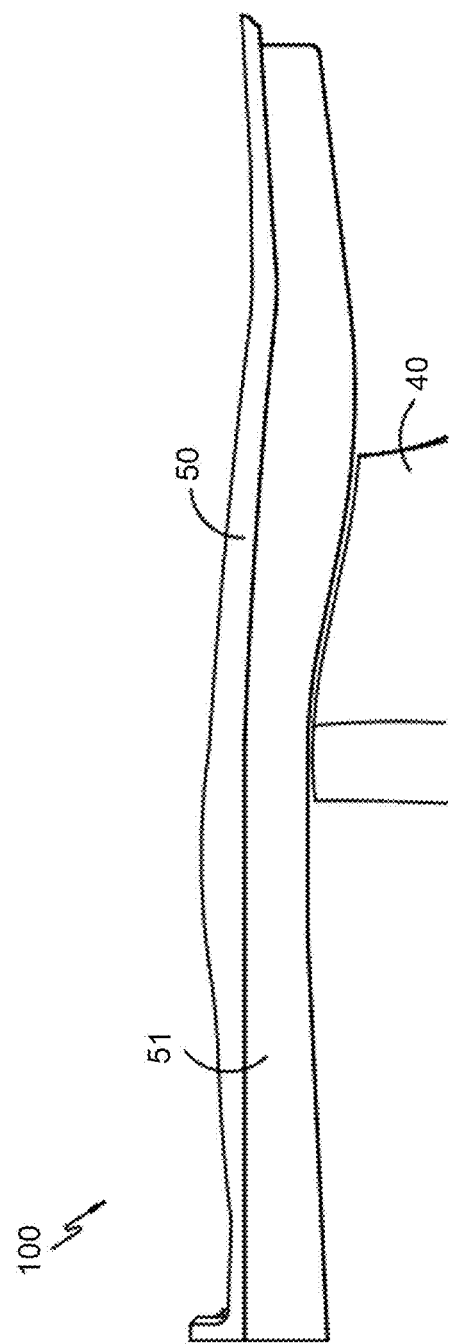
FIG. 2A provides a schematic cross-section view of a hardwall fan containment case assembly according to an exemplary embodiment of the present subject matter.

Referring to FIG. 2A, a hardwall fan containment case assembly 100 is shown according to an exemplary embodiment of the present subject matter. The fan containment case assembly 100 includes the fan case 50, which is disposed about the longitudinal centerline 12 (FIG. 1), and may include panels 51 on the interior of the fan case 50 that improve acoustic and blade rub characteristics. As previously described, the fan case 50 is the shell of the hardwall containment system and may be formed from a composite material, such as a PMC material. As such, the fan case 50 forms a radially outermost portion of the fan containment case assembly 100, helping contain objects travelling outward from within the panels 51 from continuing to travel beyond the fan section 14. Accordingly, for hardwall containment assemblies, the fan case 50 also may be referred to as a containment case.

Figure 2B:
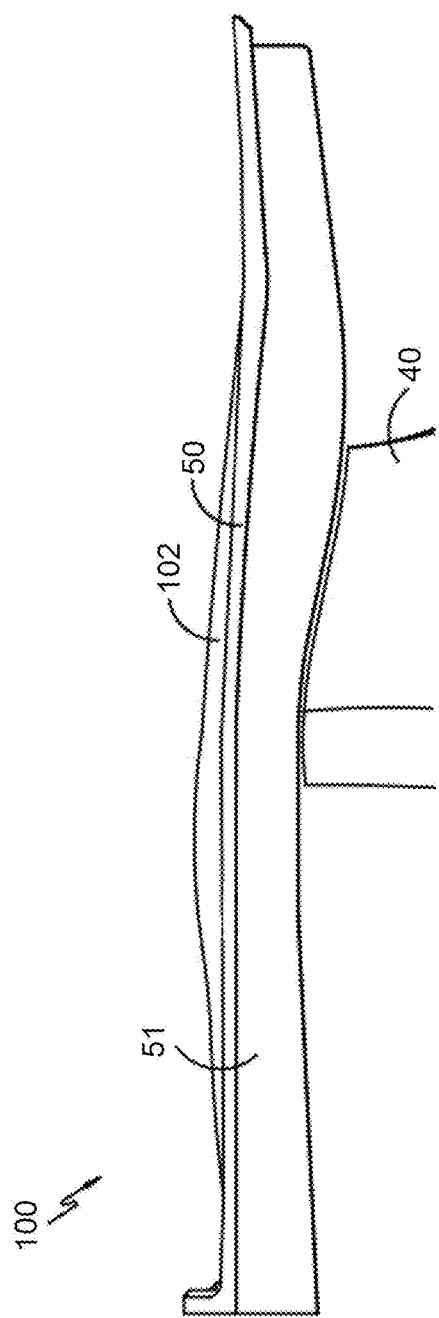
FIG. 2B provides a schematic cross-section view of a hardwall fan containment case assembly according to another exemplary embodiment of the present subject matter.

FIG. 2B illustrates another exemplary embodiment of a hardwall fan containment case assembly 100. As depicted, the fan containment case assembly 100 includes the fan case 50, which is disposed about the longitudinal centerline 12 (FIG. 1), and may include panels 51 on the interior of the fan case 50 that improve acoustic and blade rub characteristics. Additionally, an outer layer 102 of composite material is applied over at least a portion of the outer surface of the fan case 50. As previously described, the fan case 50 is the shell of the hardwall containment system and may be formed from a metallic material, and the outer layer 102 may be considered extra shell material, e.g., composite material, such as a PMC material, applied to the outer surface of the fan case 50. In such embodiments, the outer layer 102 forms a radially outermost portion of the fan containment case assembly 100, helping contain objects travelling outward from within the panels 51 from continuing to travel beyond the fan section 14. The fan case 50 and composite outer layer 102 may be referred to as the containment case of the fan containment case assembly 100.

Figure 3:
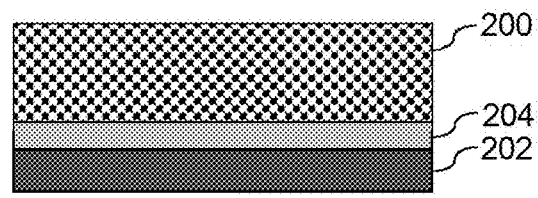
FIG. 3 illustrates a portion of a component including a substrate having a coating thereon according to an exemplary embodiment of the present disclosure.

As noted above certain components of the turbine engine, such as the fan case 50, can be fabricated from PMC materials. These components can then be coated with the coating system 202 provided herein. For example, as shown in FIG. 3, the composite component, such as the fan case 50, can include a composite substrate 200 having a coating system 202 thereon. An adhesive layer 204 can be used to adhere the coating system 202 to the composite substrate 200. The coating system 202 is sufficiently non-porous such that hydrocarbon fuel, oils, and other carbonaceous fluids are prevented from contacting the surface of the composite substrate 200 and absorbing therein. Thus, the coating system 202 may be referred to as an "oil barrier coating" given its ability to prevent hydrocarbon oils and fuels from wetting and being absorbed into composite components.

The coating system 202 can include an aluminum layer. For example, a thin layer of aluminum or aluminum foil can be disposed on and adhered to the composite substrate. The aluminum layer should be sufficiently non-porous. Utilizing an aluminum layer in the coating system 202 has the added advantage of being an oxygen barrier, thus preventing oxygen from encountering the surface of the composite component and thereby further preventing oxidative damage to the composite component.

In other embodiments, the coating system 202 can include a film layer formed from a polyethylene film or a polypropylene film. In certain embodiments, the polyethylene film layer can include low density polyethylene (LDPE), linear low-density polyethylene (LLDPE), high density polyethylene (HDPE), metallocene polyethylene (mPE), and combinations thereof. The polyethylene film can be blended with other polymers and/or additives, fillers, pigments, etc. to alter the properties of the polyethylene film according to desired properties for application on a composite component. The polypropylene film layer can include cast unoriented polypropylene (CPP), biaxially oriented polypropylene (BOPP), and combinations thereof. In certain embodiments, biaxially oriented polypropylene may be preferred given its ability to resist degradation at high temperatures, such as temperatures up to 200° C. The polypropylene film can be blended with other polymers and/or additives, fillers, pigments, etc. to alter the properties of the polypropylene film according to desired properties for application on the composite component.

In embodiments, the polyethylene film layer or polypropylene film layer can be applied directly to the composite substrate 200. For example, a polyethylene polymer composition or polypropylene polymer composition can be melt-extruded onto the composite substrate 200 at locations where the coating system 202 is desired.

One of the difficulties associated with applying polymer-based films or metal films to PMC material components is that the coating and the substrate may be susceptible to separation from one another. Accordingly, an adhesive layer 204 can be used to secure the coating system 202 containing an aluminum layer and/or a polymer-based film layer to the composite substrate 200. Suitable adhesives can include any epoxy-based or acrylate-based adhesives. Other suitable adhesives include heat seal adhesives. Heat seal adhesives can include acrylic emulsion heat seal adhesives or ethylene vinyl acetate (EVA) heat seal adhesives. Such adhesives can be applied to the composite substrate by any suitable method including, knife over roll, reverse roll, nip roller, gravure, brush, spray, or roller.

Figure 4:
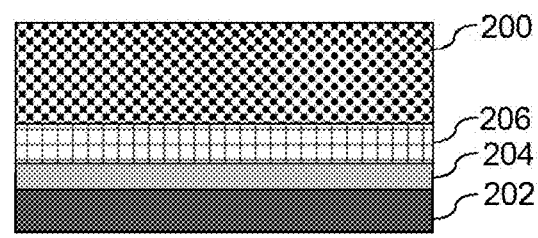
FIG. 4 illustrates a portion of a component including a substrate having a coating thereon according to another exemplary embodiment of the present disclosure.

Generally, the amount of adhesive used is not critical. Accordingly, due to the high cost of certain adhesives, it may be preferable to employ as little adhesive as possible while still achieving sufficient adhesion between the composite substrate 200 and the coating system 202. In certain other embodiments, however, it may be desirous to use an increased amount of adhesive, creating a thicker adhesive layer between the coating system 202 and the composite substrate 200. For example, when the coating system 202 includes an aluminum layer, a thicker adhesive layer 204 may be used, the thickness sufficient to prevent galvanic corrosion of the aluminum layer in the coating system 202. In other embodiments, and as shown in FIG. 4, a fiberglass ply 206 is disposed between the composite substrate 200 and the adhesive layer 204. The fiberglass ply 206 in combination with the adhesive layer 204 serve to prevent galvanic corrosion of the aluminum layer in the coating system 202.

The composite substrate 200 may include a PMC material containing fiberglass. For example, one or more layers of fiberglass plies can be dispersed in a suitable matrix, such as a thermoset or thermoplastic resin, and cured in order to form the composite substrate 200. The composite substrate 200 may alternatively include a PMC material containing carbon fiber. For example, one or more layers of carbon fiber plies can be dispersed in a suitable matrix, such as a thermoset or thermoplastic resin, and cured to form the composite substrate. In embodiments, the composite substrate 200 could include both carbon fiber plies and fiberglass plies. For example, one or more layers of carbon fiber plies can be used to form the core of the composite with one or more layers of fiberglass plies disposed on the carbon fiber core. The carbon fiber plies and fiberglass plies can be dispersed in a suitable matrix, such as a thermoset or thermoplastic resin, and cured to form the composite substrate 200. Accordingly, the composite substrate 200 can include a fiberglass polymer matrix composite, a carbon fiber polymer matrix composite, or a combination thereof.

Figure 5:
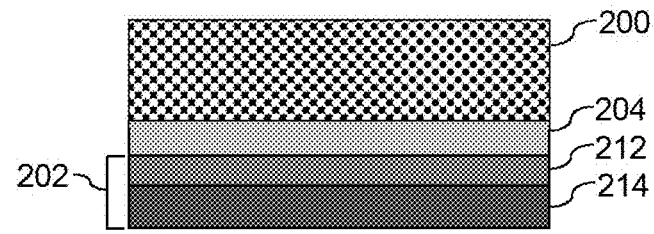
FIG. 5 illustrates a portion of a component including a substrate having a coating thereon according to another exemplary embodiment of the present disclosure.

Referring now to FIG. 5, the coating system 202 can include one or more layers of material, for example, the coating system 202 can include an aluminum layer 212 with a film layer 214 disposed thereon. The film layer 214 can include a polyethylene or polypropylene film, such as biaxially oriented polypropylene. The film layer 214 can protect the aluminum layer 212 against nicks and punctures during use of the composite component.

Also provided are methods for forming a containment case of a gas turbine engine. The method includes forming a containment case from a polymer matrix composite material and coating the polymer matrix composite material with a coating system including an aluminum layer, a polyethylene film layer, a polypropylene film layer, or a combination thereof. The coating system is substantially non-porous such that the hydrocarbon fuel or other carbonaceous fluids are prevented from contacting and impregnating the polymer matrix composite material. The method also includes disposing the containment case about a plurality of fan blades of the gas turbine engine.

Accordingly, the present subject matter is directed to utilizing a coating system to prevent oil from contacting and impregnating composite structures. More particularly, the present subject matter provides a coating system suitable for application on polymer matrix composite components on gas turbine engines. The coating system provides an oil barrier for composite components, particularly PMC components. Advantageously, the coated components provided herein are resistant to oil exposure and absorption and can be repaired as opposed to other composite components that have absorbed hydrocarbon fluids. Repair materials, such as patches and slurries, that are often used to repair polymer matrix composite materials are unable to bond appropriately to polymer matrix composite components that have been wetted by hydrocarbon fluids. Since the coated components provided herein prevent hydrocarbon wetting at the surface of the polymer matrix composite component, such components are able to bond with repair material, thus facilitating repair and reducing the number of polymer matrix composite component parts that have to be scrapped. Other advantages of the subject matter described herein also may be realized by those of ordinary skill in the art.

While exemplary aspects provided herein are directed to engine and fan casings, the disclosure is not so limited. For example, it is conceivable that other components of a gas turbine engine formed from PMC materials or other composite materials such as CMC materials can be coated with the coating system provided herein to provide an oil barrier for other engine component parts.

Further aspects of the invention are provided by the subject matter of the following clauses:

1. A coated component, comprising: a composite substrate; a coating system disposed on the composite substrate, the coating system comprises a non-porous coating system such that hydrocarbon fuel or other carbonaceous fluids are prevented from contacting and impregnating the composite substrate.

2. The component of any preceding clause, wherein the coating system comprises at least one aluminum layer or at least one film layer comprising a polyethylene film or a polypropylene film.

3. The component of any preceding clause, wherein the composite substrate includes a polymer matrix composite substrate.

4. The component of any preceding clause, wherein the polymer matrix composite substrate comprises a fiberglass polymer matrix composite substrate.

5. The component of any preceding clause, wherein the polymer composite substrate comprises a carbon fiber polymer matrix composite substrate.

6. The component of any preceding clause, wherein the coating system comprises an aluminum layer adhered to the composite substrate with an adhesive layer, further wherein a fiberglass ply layer is sandwiched between the composite substrate and the adhesive layer.

7. The component of any preceding clause, wherein the coating system includes at least one aluminum layer having at least one film layer disposed thereon, wherein the at least one film layer comprises a polyethylene film or a polypropylene film.

8. The component of any preceding clause, wherein the coating system includes at least one aluminum layer adhered to the substrate with an adhesive layer, wherein the adhesive layer is sufficiently thick so as to prevent galvanic corrosion of the aluminum layer.

9. The component of any preceding clause, wherein the coating system includes at least one film layer including a polyethylene film or a polypropylene film, wherein the film layer is extruded on to a surface of the composite substrate.

10. The component of any preceding clause, wherein the coating system is adhered to the composite substrate via an adhesive layer.

11. The component of any preceding clause, wherein the adhesive layer comprises a heat seal adhesive.

12. The component of any preceding clause, wherein the adhesive layer comprises an epoxy-based adhesive, an acrylate-based adhesive, or combinations thereof.

13. The component of any preceding clause, wherein the component is a gas turbine engine component.

14. The component of any preceding clause, wherein the component is a composite fan casing or a composite containment duct.

15. A composite fan casing for a gas turbine engine, the casing comprising: a polymer matrix composite substrate; and a coating system disposed on the polymer matrix composite substrate, the coating system is substantially non-porous such that hydrocarbon fuel or other carbonaceous fluids are prevented from contacting and impregnating the composite substrate.

16. The composite fan casing of any preceding clause, wherein the coating system comprises at least one aluminum layer or at least one film layer comprising a polyethylene film or a polypropylene film.

17. The composite fan casing of any preceding clause, wherein the coating system is adhered to the polymer matrix composite substrate via an adhesive layer.

18. The composite fan casing of any preceding clause, wherein the coating system includes at least one aluminum layer having at least one film layer comprising a polyethylene film or a polypropylene film disposed thereon.

19. The composite fan casing of any preceding clause, wherein the coating system comprises an aluminum layer adhered to the polymer matrix composite substrate with an adhesive layer, further wherein a fiberglass ply layer is sandwiched between the polymer matrix composite substrate and the adhesive layer.

20. A method for forming a containment case of a gas turbine engine, comprising: forming a containment case from a polymer matrix composite material; coating the polymer matrix composite material with a coating system including an aluminum layer, a polyethylene film layer, a polypropylene film layer, or combinations thereof, the coating system being substantially non-porous such that hydrocarbon fuel or other carbonaceous fluids are prevented from contacting and impregnating the polymer matrix composite material; and disposing the containment case about a plurality of fan blades of the gas turbine engine.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A coated component, comprising:
   a composite fan casing substrate; and
   a non-porous coating system disposed on the composite fan casing substrate, the coating system comprising at least one aluminum layer having a first side and an opposing second side, the first side being adhered to the composite fan casing substrate with an adhesive layer, and at least one film layer comprising both a polyethylene film and a polypropylene film, disposed on the second side of the at least one aluminum layer.

2. The component of claim 1, wherein the composite fan casing substrate includes a polymer matrix composite substrate.

3. The component of claim 2, wherein the polymer matrix composite substrate comprises a fiberglass polymer matrix composite substrate.

4. The component of claim 2, wherein the polymer matrix composite substrate comprises a carbon fiber polymer matrix composite substrate.

5. The component of claim 1, wherein a fiberglass ply layer is sandwiched between the composite fan casing substrate and the adhesive layer.

6. The component of claim 1, wherein the adhesive layer is sufficiently thick so as to prevent galvanic corrosion of the at least one aluminum layer.

7. The component of claim 1, wherein the adhesive layer comprises a heat seal adhesive.

8. The component of claim 7, wherein the adhesive layer comprises an epoxy-based adhesive, an acrylate-based adhesive, or combinations thereof.

9. The component of claim 1, wherein the at least one film layer is the outermost layer of the coating system.

10. The component of claim 1, wherein the at least one film layer comprises Biaxially Oriented Polypropylene.

11. A composite fan casing for a gas turbine engine, the casing comprising:
    a polymer matrix composite substrate; and
    a substantially non-porous coating system disposed on the polymer matrix composite substrate, the coating system comprising at least one aluminum layer having a first side and an opposing second side, the first side being adhered to the composite substrate with an adhesive layer, and at least one film layer comprising a polyethylene film or a biaxially oriented polypropylene film, disposed on the second side of the at least one aluminum layer.

12. The composite fan casing of claim 11, wherein the coating system is adhered to the polymer matrix composite substrate via an adhesive layer.

13. The composite fan casing of claim 11, wherein the adhesive layer is sufficiently thick so as to prevent galvanic corrosion of the aluminum layer.

14. The composite fan casing of claim 11, wherein the coating system comprises an aluminum layer adhered to the polymer matrix composite substrate with an adhesive layer, further wherein a fiberglass ply layer is sandwiched between the polymer matrix composite substrate and the adhesive layer.

15. The composite fan casing of claim 11, wherein the at least one film layer is the outermost layer of the coating system.

16. The composite fan casing of claim 11, wherein the at least one film layer comprises both a polyethylene and a polypropylene layer.

17. A method for forming a containment case of a gas turbine engine, comprising:
    forming a fan containment case from a polymer matrix composite material;
    coating the polymer matrix composite material with a coating system including an aluminum layer having a first side and an opposing second side, the first side being adhered to the polymer matrix composite material with an adhesive layer, a polyethylene film layer, and a polypropylene film layer, disposed on the second side of the aluminum layer; and
    disposing the fan containment case about a plurality of fan blades of the gas turbine engine.

18. The method of claim 17, comprising:
    disposing an adhesive on the polymer matrix composite material with an adhesive layer to form the adhesive layer thereon for adhering the coating to the polymer matrix composite material with an adhesive layer.

* * * * *